June 15, 1943.   C. T. SMITH   2,322,168
HOSE COUPLING
Filed Jan. 12, 1942

INVENTOR.
CHARLES T. SMITH
BY Milburn & Milburn
ATTORNEYS.

Patented June 15, 1943

2,322,168

UNITED STATES PATENT OFFICE 2,322,168

HOSE COUPLING

Charles T. Smith, Cleveland Heights, Ohio

Application January 12, 1942, Serial No. 426,389

1 Claim. (Cl. 285—175)

This invention relates to the art of hose couplings and is an improvement upon my Patent No. 1,810,735 of June 16, 1931, to which reference may be had for a fuller understanding of the coupling structure adopted in the present form of illustration.

The object of the present invention is to devise a means for positively and securely locking together the parts of the coupling which are interengaged by means of a bayonet lock, the purpose of my locking means being to prevent accidental disengagement of the coupling members.

More specifically, my present invention consists in providing a hose coupling with a locking means that will be automatically actuated upon engagement of the coupling members so as to prevent accidental release of the same but which may be released by a simple manipulation at any time desired.

Other objects will appear from the following description and claim when considered together with the accompanying drawing.

Referring to the accompanying drawing.

Figure 1:
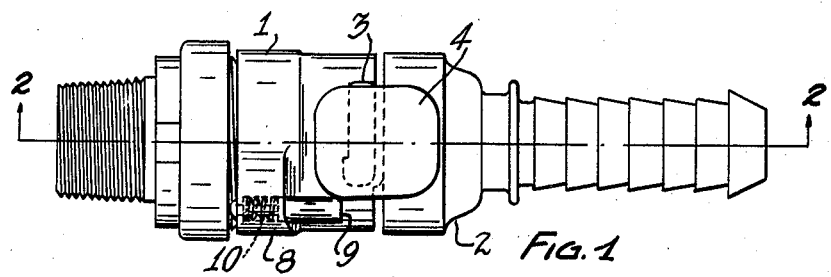
Fig. 1 is an elevation of a hose coupling embodying my present improvement.
Figure 2:
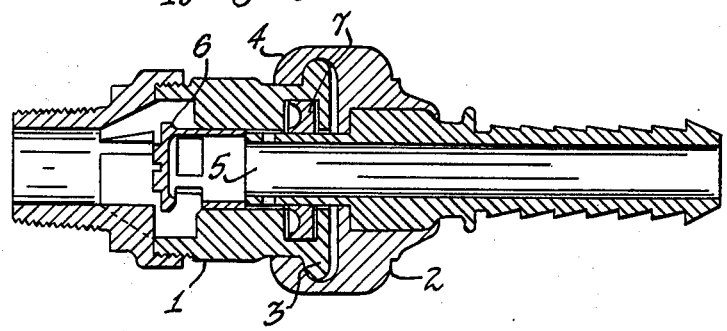
Fig. 2 is a sectional view taken on line 2—2 of Fig. 1.

It is to be understood that the present form of disclosure is merely for the purpose of illustration and that there may be devised various modifications without departing from the spirit of my invention as herein set forth and claimed.

The particular type of hose coupling to which my present improvement is here shown as being applied comprises the main members 1 and 2 which are provided with the locking lugs 3 and companion sockets 4, respectively, for co-operation in the usual manner of bayonet lock engagement. The member 1 has means of connection to the air pressure line while the other member is adapted to be connected to the hose for delivery of the air under pressure to the point of use. The projection 5 on the one member 2 is adapted to unseat the valve 6 within the other member 1 as these coupling members are brought into operative engagement so as to permit passage of the air therethrough; and the walls of the resilient grooved annular gasket 7 are adapted to be expanded laterally by the force of the air pressure so as to effectively seal the coupling connection against leak. This brief statement will suffice for an understanding of the hose coupling to which the present invention is applied, although it is to be understood that this same improvement may be applied to other forms of couplings as well.

Upon the member 1 there is provided the boss 8 through which extends the pin 9 normally forced outwardly or towards the right, as viewed in Fig. 1 of the drawing, by means of the coil spring 10 permanently housed within the boss 8. This pin 9 is located at the proper point with respect to the lugs 3 for co-operation with one of the sockets 4 so as to be brought into engagement beyond the corner shoulder of the socket when the members have been brought into engagement with each other in the usual manner of bayonet lock engagement as indicated in Fig. 1 of the drawing. That is, as the members are so engaged, the pin 9 will be forced inwardly or to the left, as viewed in the present drawing, either by the hand of the operator or by engagement of the pin 9 with the rounded corner of the socket 4 as the parts are slightly retracted by the turning action thereof during engagement of the parts in the usual manner. Then, as the bayonet lock engagement is effected, the pin 9 will be released so as to be forced by its spring 10 towards the right, as viewed in Fig. 1, for engagement behind the socket wall 4 and thereby prevent accidental reverse turning between the coupling members.

Figure 3:
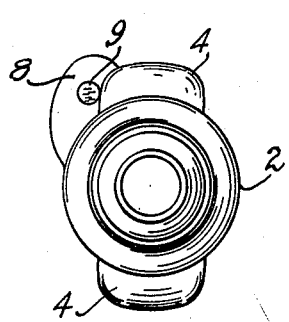
Fig. 3 is an end elevation of a hose coupling embodying this improvement.

Because of the interengagement of the lug and socket at the left-hand end of their path of turning movement, as viewed in Fig. 3, the bayonet lock can be released only by relative turning movement in the reverse direction from that employed for their engagement.

Thus, unless and until it is desired to disengage the coupling members, they will remain in effective engagement. However, when it is desired to release the coupling and disengage the same, this may be done by manually forcing the spring pin 9 inwardly or towards the left, as viewed in Fig. 1 of the drawing, so as to permit the reverse turning of the bayonet locking members in the usual manner. As indicated in the drawing, the corner portions of the sockets 4 are of such curved configuration that they will permit the spring pin to pass thereby when it is sufficiently withdrawn but will serve to hold the pin against accidental reverse movement thereby when the parts are in the locked position as above described.

Although, as above explained, the coupling members may be retracted sufficiently during the regular turning movement of the same for the locking engagement to permit the spring pin 9 to pass the curved shoulder of the socket 4, thereby permitting the pin to be withdrawn without requiring any particular attention by the operator, yet after the parts have been locked in engagement, the spring pin can not be forced past the shoulder of the socket 4 by merely attempting to turn the parts relatively to each other as the locked condition of the parts prevents the coupling members from any such retractive movement relatively to each other as was possible during the initiation of the turning movement for the locking engagement. Thus, the parts after having been once brought to locked position, will remain in such condition until the spring pin 9 is positively released by the hand or finger of the operator so as to permit the bayonet locking means to be released in the regular manner.

As explained in my patent, supra, the force of the air against the inner wall of the gasket will tend to hold the engaged parts against accidental relative turning, and the present locking means might be considered as a further means for this purpose. Thus the present device is doubly secure against accidental release of the members from locked condition.

The present locking means is of a positive character and ensures the coupling against any danger of accidental disconnection at any time, and yet this locking means can be released in a convenient and simple manner at any time it is desired to disconnect the coupling members. Also, this feature of ensured safety is of a very simple construction and hence not costly to embody as part of the coupling. Because of the particular form and location of the present locking means, there is required but one locking pin which may have effective engagement with either of the sockets 4; and so the parts of the coupling may be brought into engagement in the same maner as in the case of the regular coupling having bayonet locking connection and without requiring any particular attention because of the lock herein provided.

What I claim is:

A hose coupling comprising two members provided with bayonet lug and socket means, respectively, for interlocking engagement to prevent accidental longitudinal displacement between said members, said members being adapted to be interengaged by first inserting said socket-carrying member longitudinally into initial position with its socket means to one side of the lug means upon the other member preparatory to effecting relative rotary movement of said members for bringing said lug and socket means into locking engagement, a longitudinally disposed spring pin of plain straight form provided upon said lug-carrying member at a point between a lug and said initial position of its socket, said socket being formed with a curved shoulder that is adapted to be engaged by the plain end of said pin during relative rotary movement of said members, and said socket being adapted to be forced fully past the end of said pin during such relative turning of said members so as to bring said socket and lug into full engagement with each other and at the same time effect locking engagement of said pin with the side of said socket so as to prevent accidental rotary movement between said members.

CHARLES T. SMITH.